(12) United States Patent
Alfredsson et al.

(10) Patent No.: US 9,830,364 B2
(45) Date of Patent: Nov. 28, 2017

(54) WEIGHT BASED VISUAL COMMUNICATION OF ITEMS REPRESENTING PROCESS CONTROL OBJECTS IN A PROCESS CONTROL SYSTEM

(71) Applicant: ABB RESEARCH LTD, Zürich (CH)

(72) Inventors: Fredrik Alfredsson, Västerås (SE); Elina Vartiainen, Västerås (SE); Jonas Brönmark, Västerås (SE); Magnus Larsson, Västerås (SE)

(73) Assignee: ABB Research Ltd, Zürich (CH)

(*) Notice: Subject to any disclaimer, the term of this patent is extended or adjusted under 35 U.S.C. 154(b) by 0 days.

(21) Appl. No.: 15/028,093

(22) PCT Filed: Oct. 28, 2013

(86) PCT No.: PCT/EP2013/072506
§ 371 (c)(1),
(2) Date: Apr. 8, 2016

(87) PCT Pub. No.: WO2015/062622
PCT Pub. Date: May 7, 2015

(65) Prior Publication Data
US 2016/0246793 A1 Aug. 25, 2016

(51) Int. Cl.
*G06F 17/30* (2006.01)
*H04W 4/00* (2009.01)
(Continued)

(52) U.S. Cl.
CPC ....... *G06F 17/3053* (2013.01); *G05B 19/042* (2013.01); *G06F 3/0482* (2013.01); *G06F 3/04847* (2013.01); *G06F 17/30241* (2013.01); *G06F 17/30554* (2013.01); *H04B 7/26* (2013.01); *H04L 67/12* (2013.01); *H04W 4/006* (2013.01); *H04W 4/008* (2013.01); *H04W 4/023* (2013.01); *H04W 4/028* (2013.01); *H04W 4/18* (2013.01); *H04W 84/12* (2013.01)

(58) Field of Classification Search
CPC ....... G06F 17/30; G06F 3/0482; G06F 3/0484
See application file for complete search history.

(56) References Cited

U.S. PATENT DOCUMENTS 7,403,801 B2    7/2008  Ishigaki
8,042,048 B2 *  10/2011 Wilson ................ H04L 12/2807
                                                    700/17
(Continued)

FOREIGN PATENT DOCUMENTS

WO    WO 2011/067454 A1    6/2011

*Primary Examiner* — David Choi
(74) *Attorney, Agent, or Firm* — Birch, Stewart, Kolasch & Birch, LLP

(57) ABSTRACT

A method, item communication arrangement and a computer program product communicate items representing process control objects to a user of a wireless terminal in a process control system. The arrangement includes an item communication control unit providing the items representing process control objects and configured to continuously determine weights of the items and visually communicate items to the user via the wireless terminal in an order defined by the weights of the items. The weight of an item is determined based on an item selection pattern of the user.

14 Claims, 4 Drawing Sheets

(51) Int. Cl.
*H04W 4/18* (2009.01)
*H04L 29/08* (2006.01)
*H04W 4/02* (2009.01)
*G05B 19/042* (2006.01)
*G06F 3/0482* (2013.01)
*G06F 3/0484* (2013.01)
*H04B 7/26* (2006.01)
*H04W 84/12* (2009.01)

(56) References Cited

U.S. PATENT DOCUMENTS

| | | | |
|---|---|---|---|
| 2002/0143890 A1* | 10/2002 | Naqvi | G06F 17/30864 709/217 |
| 2006/0259867 A1 | 11/2006 | Watson et al. | |
| 2008/0275690 A1 | 11/2008 | Brull et al. | |
| 2009/0216341 A1 | 8/2009 | Enkerud et al. | |
| 2011/0119217 A1* | 5/2011 | Moon | G06Q 30/02 706/46 |
| 2011/0258216 A1 | 10/2011 | Supakkul et al. | |
| 2012/0005023 A1 | 1/2012 | Graff | |
| 2012/0289147 A1 | 11/2012 | Raleigh et al. | |
| 2013/0145272 A1* | 6/2013 | Boggie | G06F 3/0487 715/728 |
| 2013/0167035 A1* | 6/2013 | Imes | F24F 11/0012 715/736 |
| 2014/0108978 A1* | 4/2014 | Yu | G06F 3/0482 715/765 |
| 2014/0258879 A1* | 9/2014 | DeLuca | H04M 1/72572 715/744 |
| 2014/0380183 A1* | 12/2014 | Esaka | G06F 3/0481 715/740 |
| 2016/0246793 A1* | 8/2016 | Alfredsson | G05B 19/042 |

* cited by examiner

US 9,830,364 B2

WEIGHT BASED VISUAL COMMUNICATION OF ITEMS REPRESENTING PROCESS CONTROL OBJECTS IN A PROCESS CONTROL SYSTEM

FIELD OF THE INVENTION

The present invention generally relates to process control systems. More particularly the present invention relates to a method, searching arrangement and a computer program product for searching for process control objects in a process control system.

BACKGROUND

A process control system normally comprises a number of process control objects involved in the control of the process.

In process control systems there are furthermore maintenance engineers that are most of the time working on the process floor close to these process control objects, which is typically far away from control rooms with work stations and other computers from which the system is monitored. The maintenance engineers make sure the process runs as smooth as possible by both preventive and direct maintenance. They are furthermore nowadays provided with wireless terminals for assisting them with various tasks in relation to the process control system.

Plant maintenance engineers working in the process industry maintain the production by performing scheduled maintenance work for equipment and repairing equipment that is broken. When maintenance engineers initiate work according to a work order for a process control object, they will often work with the specific object for several days before the maintenance or repairs are complete. During this maintenance interval the plant maintenance engineers often need to access properties for the devices they are working with (for example, real time data, faceplates, and trends). It is therefore of interest that data about the process control object is provided to the maintenance engineer in an organized way, such as via items such as bookmarks in order to give the engineer quick access to the properties of the process control object during maintenance.

There are however some problems with such items on wireless terminals. Large amounts of stored items can be a problem because of the limited screen size. It can be difficult to find information if there is too much to choose from. Users furthermore have to manually remove old unwanted items.

The present invention addresses one or more of the above-mentioned issues.

SUMMARY OF THE INVENTION

The present invention addresses the problem of simplifying, for a user of a process control system, access to items of interest that represent process control objects in the system.

This object is according to a first aspect of the invention achieved through a method for communicating items representing process control objects to a user of a wireless terminal in a process control system, the method being performed in an item communication control unit of an item communication arrangement and comprising:

continuously determining weights of the items, and
visually communicating items to the user via the wireless communication device in an order defined by the weights of the items,
wherein the weight of an item is determined based on an item selection pattern of the user.

This object is according to a second aspect of the invention achieved through an item communication arrangement for communicating items representing process control objects to a user of a wireless terminal in a process control system, the item communication arrangement comprising:
an item communication control unit providing said items representing process control objects and configured to
continuously determine weights of the items, and
visually communicate items to the user via the wireless terminal in an order defined by the weights of the items,
wherein the weight of an item is determined based on an item selection pattern of the user.

This object is according to a third aspect of the invention solved through a computer program product for computer program product for communicating items representing process control objects to a user of a wireless terminal in a process control system, the computer program product being provided on a data carrier comprising computer program code configured to cause an item communication arrangement to, when the computer program code is loaded into at least one device providing the item communication arrangement,
continuously determine weights of the items, and
visually communicate items to the user via the wireless terminal in an order defined by the weights of the items,
wherein the weight of an item is determined based on an item selection pattern of the user.

The present invention has a number of advantages. Items are visually communicated to the user in an adaptive way. The user may in this way more easily locate the items he or she is interested in, which may make maintenance more efficient. The user may thereby avoid scrolling through long lists in order to obtain the item that he or she needs. Through the use of weights it is thereby possible to determine when an item is to fade away from view. Furthermore the user does not have to make any selections in order to obtain the view of the items.

BRIEF DESCRIPTION OF THE DRAWINGS

The present invention will in the following be described with reference being made to the accompanying drawings, where FIG. 1 schematically shows a process control system operating an industrial process together with a wireless terminal associated with a user, FIG. 2 schematically shows a block schematic of the wireless terminal.

DETAILED DESCRIPTION OF THE INVENTION

In the following, a detailed description of preferred embodiments of a method, item communication arrangement and a computer program product for visually communicating items representing process control objects in a process control system will be given.

Figure 1:
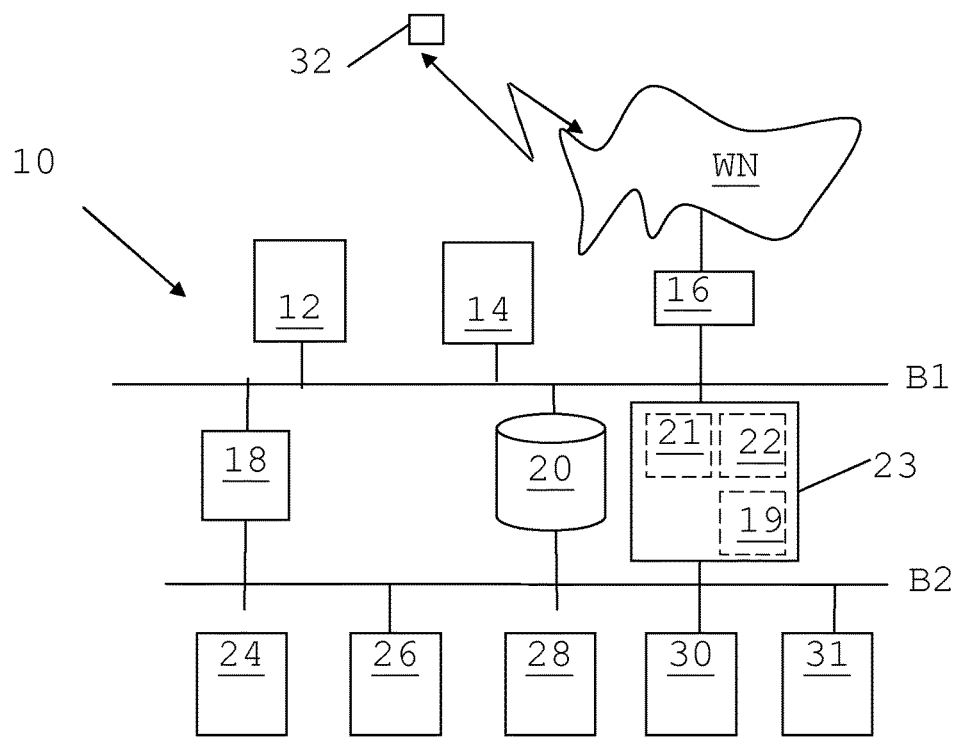

FIG. 1 schematically shows a process control system 10. The process control system 10 is a computerized process control system for controlling an industrial process. The process can be any type of industrial process, such as electrical power generation, transmission and distribution processes as well as water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers, which communicate with a server handling monitoring and control of the process.

In FIG. 1 the process control system 10 therefore includes a number of process monitoring computers 12 and 14. These computers may here also be considered to form operator terminals and are connected to a first data bus B1. There is also a gateway 16 connected to this first data bus B1, which gateway 16 is connected to at least one wireless network WN. To the wireless network WN there is connected a wireless terminal 32. It should be realized that it is possible with more wireless terminals in the wireless network WN. However, only one is shown for simplifying the understanding of the present invention. The wireless network WN may be a local network, such as a wireless local area network (WLAN). It may also be a Bluetooth network, i.e. a network with a number of interconnected Bluetooth nodes.

There is furthermore a second data bus B2 and between the first and second data busses B1 and B2 there are connected a server 18 providing control and protection of the process and a database 20 where data relating to control and protection of the process is stored. Such data relating to control and protection may here comprise process data such as measurements and control commands, while data relating to protection may comprise alarm and event data as well as data on which alarms and events can be generated, such as measurements made in the process. The database 20 may also comprises data about the various process control objects in the system, such as what type of objects they are, the positions they have and in what locations they are provided, such as in what building of a plant they are provided, where the process control system is at least in part provided in this plant. The database 20 may also comprise further data about the objects as well as a graphical representations of, blueprints, circuit charts and user manuals associated with the process control objects. There is furthermore an item communication server 23 connected between the two buses B1 and B2. The item communication server 23 comprises a positioning block 21 and an item communication control block 22. There is also an item archive 19.

To the second data bus B2 there is connected a number of further devices 24, 26, 28, 30 and 31. These further devices 24, 26, 28, 30 and 31 are field devices, which are devices that are interfaces to the process being controlled. A field device is typically an interface via which measurements of the process are made and to which control commands are given. Because of this the field devices are furthermore process control objects. There is thus a first, second, third, fourth and fifth process control object 24, 26, 28, 30 and 31. The first process control object 24 may as an example be a boiler and the second process control object 26 may as an example be a motor. A process control object is not limited to being a field device. It may also be a control computer, such as the server 18, or a controller.

Figure 2:
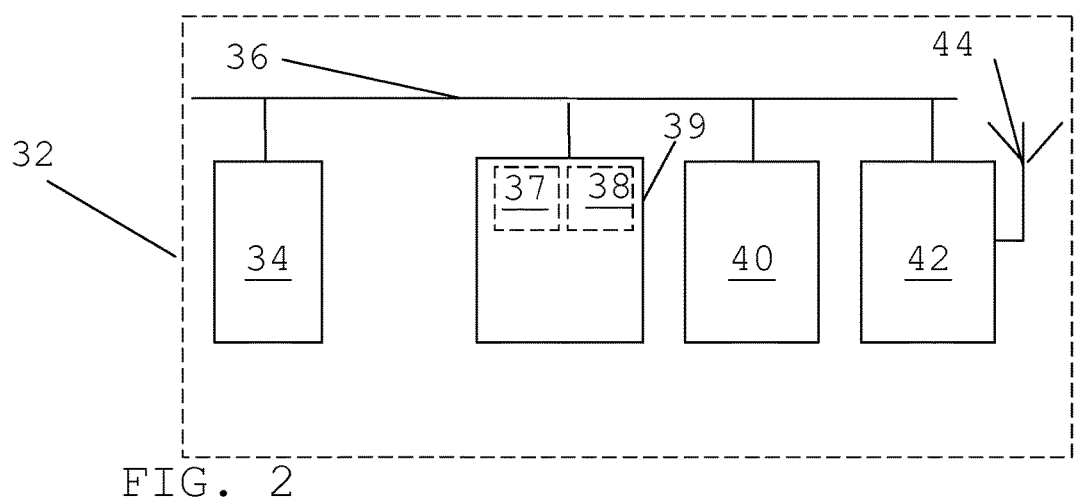

FIG. 2 shows a block schematic of the wireless terminal 32. The wireless terminal 32 comprises a bus 36 and to this bus there is connected a display 34, a program memory 39, a processor 40, as well as a radio communication circuit 42. The radio communication circuit 42 is furthermore connected to an antenna 44. The radio communication circuit 42 and antenna 44 are provided for communication with the wireless network WN.

In the program memory 39 there is provided optional software code or computer program instructions which when being run by the processor forms a positioning element 37 and an item communication control element 38.

Figure 3:
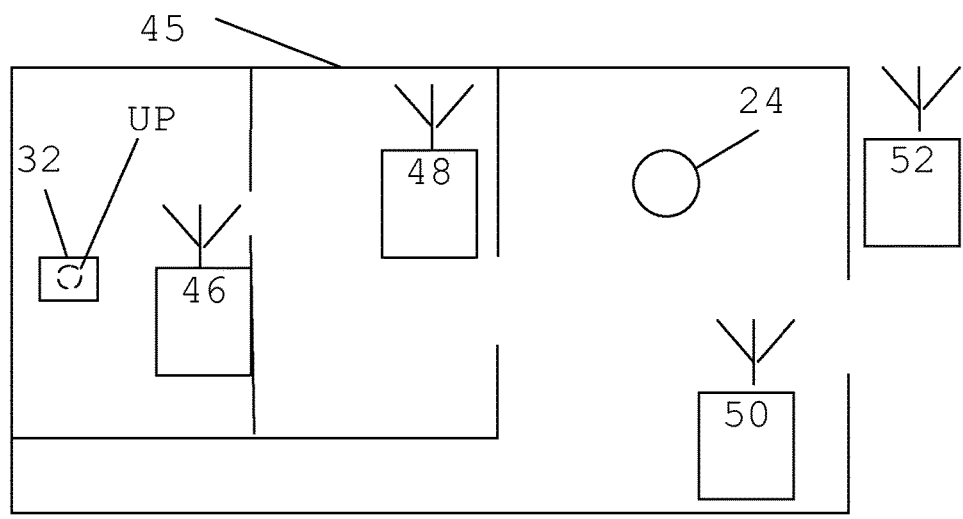
FIG. 3 shows a first building of an industrial plant with a number of rooms, where the wireless terminal is in a first of the rooms, FIG. 4 schematically shows a number of process control objects in the plant together with a user position.

FIG. 3 schematically shows one first exemplifying building or facility 45 of the industrial plant. The building has a number of rooms. There is here a first room. In the first room there is a first wireless access point 46 of the wireless network. In this figure also the first wireless terminal 32 is located in the first room, which indicates that also a corresponding user is in this first room. The position of this wireless terminal is here also termed a user position UP. Next to the first room there is a second room with a second wireless access point 48. The second room in turn leads to a third larger room with a third wireless access point 50. In the third room there is a door leading out of the first building 45 and outside of the first building there is a fourth wireless access point 52. The access points 46, 48, 50 and 52 are here furthermore located close to doors leading to or from the rooms. The first wireless access point 46 is therefore provided close to a door interconnecting the first and the second rooms, the second wireless access point 48 is located close to a door interconnecting the second and the third rooms, the third wireless access point 50 is provided close to the door leading out of the first building 45 and the fourth wireless access point 52 is provided close to the same door at the exterior of the first building 45. The above described access point positions close to doors are only exemplary. The invention is thus in no way limited to these positions. Others may be used.

In the first building 45 there are furthermore a number of process control objects and one of these is the first process control object 24, which is provided in the third room. It should be realized that there may be several more process control objects in the first building 45. However, only this first process control object 24 is shown in order to be used for demonstrating the principles of the invention.

Furthermore the positions of the wireless access points 46, 48 and 50 and 52 are typically known and because of this also the positions of the wireless terminals and consequently the users may be known.

The process control system may be provided in several buildings. One example of a building is thus given in FIG.

3. A building is one example of an area in which a part of the process control system may be provided. The process control system may thus be provided in different areas. Or differently put, the process control objects of the process control system may be provided in different areas, where an area may be or comprise a building.

Figure 4:
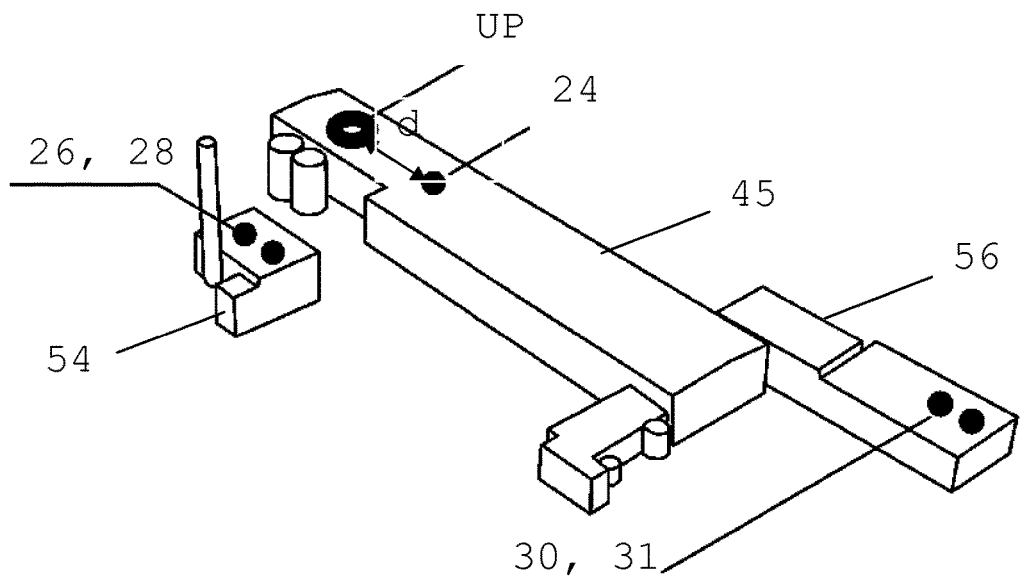

FIG. 4 schematically shows the first building 45 together with a second and third building 54 and 56. In these buildings the process control objects 24, 26, 28, 30 and 31 of FIG. 1 are also provided. In the first building 45 the position of the first process control object 24 is schematically indicated. Furthermore, the second and third process control objects 26 and 28 are indicated as being provided in the second building 54, while the fourth and fifth process control objects are indicated as being provided in the third building 56. Also the user position UP is indicated in the first building 45. As can be seen the user position UP is in the same building as the first process control object 24, but in a different building than the second, third fourth and fifth process control objects 26, 28, 30 and 31. Furthermore, the user position UP is shown as being on a distance d from the first process control object 24.

Figures 5A, 5B:
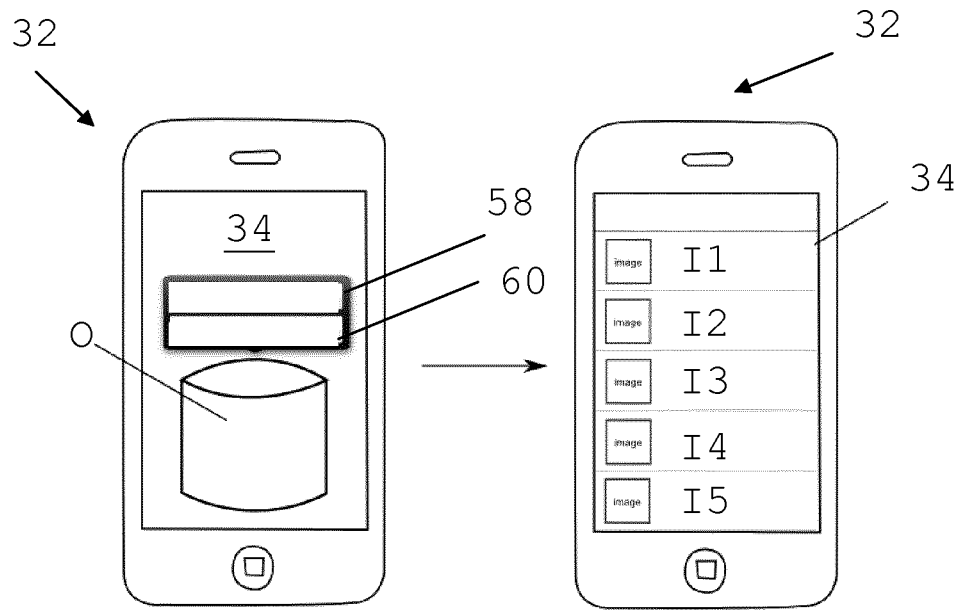
FIG. 5A shows a first view of the display of the wireless terminal where an item may be created.
FIG. 5B shows a second view of the display of the wireless terminal where a number of items in a list of items are displayed.
Figure 6:
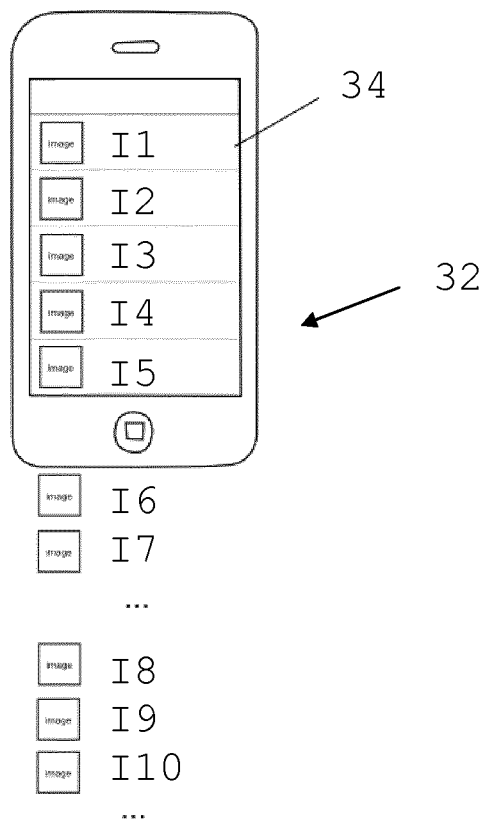
FIG. 6 shows the second view of the display of the wireless terminal as well as a number of further items of the list that are not presented.

Aspects of the invention will now be described with reference also being made to FIGS. 5A, 5B and 6, where FIG. 5A shows a first view of the display of a wireless terminal where an item may be created, FIG. 5B shows a second view of the display of the wireless terminal 32 where a number of items in a list of items are displayed and FIG. 6 shows the second view of the display 34 of the wireless terminal 32 as well as a number of further items of the list that are not presented.

Some aspects of the invention are directed towards an item communication arrangement comprising an item communication control unit and an optional positioning unit.

In some embodiments of the invention the positioning element 37 of the wireless terminal 32 forms a positioning unit. In other embodiments the positioning block 21 of the item communication server 23 forms a positioning unit.

In some embodiments the item communication control element 38 of the wireless terminal 32 forms an item communication control unit. In other embodiments of the invention, the item communication control block 22 of the item communication server 23 forms an item communication control unit.

The item communication control unit will furthermore typically access a database in the process control system, for instance database 20, in order to locate data about items for being visually communicated to a user of the wireless terminal.

The item communication control unit may furthermore have access to the item archive 19 in the item communication server 23.

It should also be realized that an item communication arrangement may be provided through any combination of the above-mentioned item communication control unit with positioning unit. The item communication arrangement may thus be provided through the item communication control element and positioning element of the wireless terminal, through the item communication control element of the wireless terminal and the positioning block of the searching server, through the positioning element of the wireless terminal and the item communication control block of the item communication server or through the positioning block and the item communication control block of the item communication server.

In the following an example of the invention will be described where the item communication control arrangement is provided through the wireless terminal of a user. The positioning element of this wireless terminal is therefore a positioning unit and the item communication control element of the terminal an item communication control unit.

Today most users of process automation software are using traditional desktop computers when interacting with the process control system. These stationary computers can be located in different locations, for example in a control room or as terminals placed on the factory floor for quick access to the control system. With the prevalence of powerful wireless terminals it is now possible to interact with the process control system wherever a user is located. The most common way of accessing the control system today is by utilizing some form of remote desktop solution.

Factories and plants include a large amount of process control objects. These process control objects may need to be checked from time to time, for instance in order to give maintenance or service. For instance, the number of boilers can be tens or hundreds. These may need to be inspected from time to time, for instance in order to perform maintenance.

A user, who may be a plant maintenance engineer working in the process industry, may then maintain the production provided by the process control system by performing scheduled maintenance work for process control objects and repairing a process control object that is broken. When the user initiates work according to a work order for a process control object he or she will often work with the specific process control object for several days before the maintenance or repairs are complete. During this maintenance interval the user often needs to access properties for the process control objects he or she is working with (for example, real time data, faceplates, and trends). It would then be advantageous to let the user use some form of item based functionality such as bookmarking, highlighting, liking and +1 functionality to get quick access to the properties of the process control object during maintenance.

Some problems have been identified with such items on wireless terminals:
Large amounts of stored items can be a problem because of the limited screen size on the wireless terminal. It can be difficult to find information if there is too much to choose from.
Users have to manually remove old unwanted items.

The invention describes a way to use a form of bookmarking/highlighting/like/+1 functionality in the form of items where a number of different factors are used to set a degree of relevance of the items for the user. This is then used for helping the user in locating the items he or she is interested in.

A user that wants to inspect a process control object may then bring his or her wireless terminal out in the plant. At such an inspection, the user may furthermore want to obtain details of the various process control objects, such as to obtain process graphics of the objects as well as real time data from the object, i.e. data measured by the process control object and reported to the control server 18. Such real time data and process graphics may then be provided together in a so-called face plate and visually communicated to the user via the display of the wireless terminal. However, as there are many process control objects the user may need a tool in which reference to the object and data related to it can be easily accessed later on, such as through the use of an item representing the process control object, where one way to implement an item is through providing a bookmark.

The item communication control element 38 may more particularly provide an application via which process control objects may be located, such as for instance via a search in a database, such as database 20, and presented to the user. An image O of a process control object, such as the first process control object, having been located by the user and being displayed on the display 34 of the wireless terminal 32 is schematically shown in FIG. 5*a*, where the image O of a process control object, here the boiler, is presented via the display by the item connection control element 38. In this view the communication control element 38 provides a first button 58 via which the user may select to view the previously mentioned face plate as well as provides a second button 60 via which the user may create an item, such as a bookmark. An item may furthermore be provided as or accompanied by some sort of graphical symbol, such as an icon. Once an item is created, i.e. once a reference to other data about the process control object is created, the item will appear in an item list with similar items associated with other process control objects. In FIG. 5B there is shown a part of such a list being displayed on the screen 34 of the wireless terminal 32 by the item communication control element 38. In this view there is a first item I1 associated with the first process control object as well as a second, third, fourth and fifth item I2, I3, I4 and I5 associated with other process control objects.

With each process control object there may thus be associated a presentation item such as a bookmark. These items may be created by several different users of the process control system.

In a process control system the number of process control objects may be great. The use of items greatly simplifies the obtaining of information about the process control objects. However as there are so many process control objects, also the number of items may be great. A user, like a plant maintenance engineer, may then want to have access to the items that are most relevant to him or here. This is especially important because the screen size of the wireless terminals is normally limited.

There is therefore a need for visually communicating the items, for instance in the form of bookmarks, to the user. The visual communication may be taking place using an application dedicated to the process control objects of the process control system, which application may be a browser application. The problem can be understood through studying FIG. 6, which also shows the display 34 of the wireless terminal 32 and the items of a list of items that are visible to the user, in this example the previously mentioned items I1-I5. However, as is indicated in the figure there are a number of further items I6-I10 that cannot be seen on the display. There is therefore a need to make a selection of which items that are to be visually communicated or displayed and with advantage a selection that results in the display of items that the user is likely to want to select.

The invention is provided for addressing this problem.

In this a number of different inputs may be used for selecting the items that are deemed to be of interest to the user and that are therefore to be visually communicated, where one type of input is the various item selections that the user makes for instance via the above-mentioned application.

The wireless terminals available today are equipped with a lot of different sensors, such as Global Positioning System (GPS), Bluetooth, and Near Field Communication (NFC). Using these sensors as well as other communication systems it is possible to detect the position of the wireless terminal in a number of ways. If the process control system is also aware of the physical position of process control objects then it is possible to determine the distance between the process control object and the wireless terminal, i.e. the distance between the process control object and the user position UP. This is a feature that can also be used with advantage in selecting items to be presented.

Figure 7:
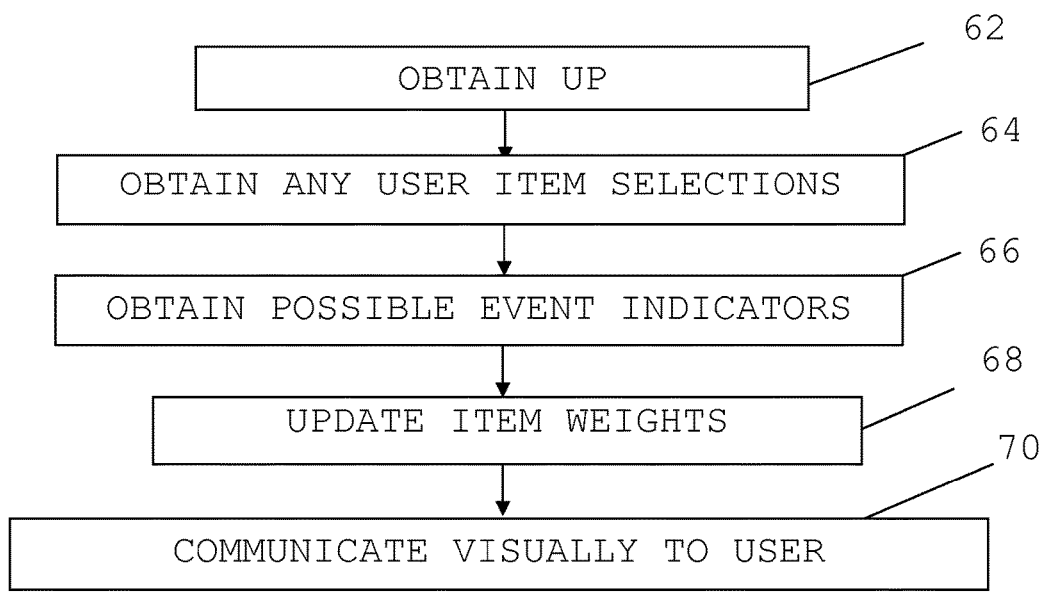
FIG. 7 shows a flow chart of a number of method steps being performed in a method for communicating items representing process control objects, and FIG. 8 schematically shows a data carrier with computer program code, in the form of a CD-ROM disc, for performing the steps of the method.

The invention is provided for addressing at least some of these issues. How this may be done will now also be described with reference being made to FIG. 7, which shows a flow chart of a number of method steps being performed in a method for communicating items representing process control objects and being performed by the item communication control element 38.

A user in the plant, such as the above mentioned plant maintenance engineer, who carries the wireless terminal 32, may have the items I1-I5 shown in FIG. 5B being displayed on the display 34 by the item communication control element 38. The items shown are items in an item list, where the items shown or displayed are furthermore the items that the item communication control element 38 calculates to be most relevant for the user. Each item represents a corresponding process control object. A user may then select an item in the list and thereby obtain further data about a certain process control object, such as a face plate, a circuit diagram or a user manual of the process control object. The user may thus need to access an item for obtaining data about a process control object in the process control system. In order to allow the user to select an item, the items of the list may be visually communicated via the display 34 of the wireless terminal 32. However, as the display size may be limited the number of items that are simultaneously visually communicated to the user may also be limited, as is readily seen in FIG. 6.

In order to enable for the user to obtain data of a desired process control object in a faster and more efficient way, it is advantageous if the user does not have to scroll the list in order to locate and access the corresponding item. It is thus of importance that the items associated with process control objects that are the most relevant to the user are visually communicated. The present invention is provided for addressing this situation.

In order to determine the items that are most relevant to the user to be displayed, the item communication control element 38 uses weights, where there is one weight for every item. The items are then provided in the list in an order defined by the weights. If the weights have been properly defined this will lead to the most relevant items being displayed first. These weights are continuously updated. As the weights are continually updated the order of the items in the list will also change as the weights change. However, in order to update the weights the item communication control element 38 needs to receive data.

In operation, the item communication control element 38 thus receives data used for updating weights. The data it obtains comprises user input data and more particularly user input data involving a creation of an item, and the time t0 of such creation or selection. It also obtains position data of the wireless terminal 32. The above mentioned data is continuously received. Depending on if some specific event occurs, it may also obtain event data, such as an alarm indicator A for a certain process control object or a maintenance indicator M for a specific process control object.

In order to perform the update of the weights, the item communication control element 38 thus obtains the user position UP, step 62, i.e. the position of the user in the process control system. The user position may be obtained in a number of different ways.

The user may manually enter the position via a user input unit that may be keypad. In this example it is a part of the display 34, which display is thereby a touch screen.

However it is also possible that the position is detected. The obtained user position UP may thus be an automatically detected position of the wireless terminal of the user. The position may be detected in a number of ways.

The positioning element 37 may detect the position via the wireless network WN. The position of the wireless terminal 32 may more particularly be obtained through knowledge of which wireless access point 46, 48, 50 and 52 the wireless terminal 32 is in contact with. The signal strength of the communication between the wireless terminal and access point may be used to determine the distance between the wireless terminal 32 and the access point, which gives a radius around the access point at which the wireless terminal may be located. This together with knowledge of the layout of the premises, such as where walls, floors and ceilings are provided, may be used for estimating the position. Furthermore, if a wireless terminal is in contact with more access points, then triangulation may be used. Here the points of intersection of the radiuses of two or three access points may be used for determining the position. Also this may be combined with knowledge of the layout of the premises in order to determine the position of the wireless terminal. In some instances it is also possible to use Global Positioning System (GPS).

The position may thus be detected by the positioning element 37 and then reported or provided to the item presentation control element 38 as a user position UP. The item presentation control element 38 thereby obtains the user position UP. Alternatively, the position may be detected by the positioning block and reported to the item communication control element 38.

Thereafter the item communication control element 38 obtains any user item selections, step 64. If the user has made any item selection, this may thus be detected. The item selection made by the user may be obtained through registering item selections that the user makes in the list of items. As mentioned earlier, the list may be scrollable in which case further items, such as the sixth and seventh items I6 and I7 shown in FIG. 6 may be shown and selected. The selections as well as the time of the selections are then registered by the item communication control element 38 and stored in an item selection memory (not shown) provided together with the item communication control element 38. It should here be realized that in the course of one run through the steps shown in FIG. 7, it is possible that no item is selected and if there is a selection may then typically only involve one item.

The item selections are in this case made via the user input unit, which in this example was a touch screen. Optionally, the item communication control element 38 also obtains possible event indicators, step 66. An event indicator may be an alarm indicator A generated by the control and protection server 18, which is conveyed to the item communication control block 22, which in turn informs the item communication control element 38. An alarm indicator A may also be obtained from the database 20 An event indicator may also be a maintenance indicator M, which may be obtained via a work order sent to the wireless terminal 32. The maintenance indicator may also be obtained by the item communication control block 21, which then reports it to the item communication control element 38.

Thereafter the weights are updated by the item communication control unit, step 68.

The item communication control element 38 may provide a weighting function W for every item, which function may have the form $$W = w1 + w2 + w3 \cdots + w(n-1) + wn \qquad (1)$$

where w is a weight factor used for forming a total weight W.

There may exist a weight function W for every item in the list. Each item I1-I10 shown in FIG. 6 may thus have an own total weight W based on a number of weight factors.

The weight W may thus be made up of n weight factors, where $n \geq 1$.

According to aspects of the invention the weight of an item is determined based on an item selection pattern of the user. This is thus a pattern by which the user selects the item. It can for this reason also be considered to be an item selection pattern of the user. For this reason the weight W may be made up of one or more use dependent weight factors. The item selection pattern can be reflected in one or more of the above mentioned weight factors. In order to do this the item communication control element 38 considers the user selections and the time of these user selections in the providing of at least one of the weight factors.

A first of these weight factors w1, which considers the user selections is a pattern weight factor and also a use dependent weight factor. This first weight factor w1 depends on a usage pattern associated with the item, which usage pattern is a pattern of the item usage over time. This pattern may comprise intervals of frequent use separated by intervals of infrequent use.

The first weight factor w1 may have a first value J1 for the interval of infrequent use and a second value J2 for the interval of frequent use, where the second value J2 may be higher than the first value. In order to set the pattern weight factor, the item communication control element 38 may predict the use of the item at a current point in time and may more particularly predict if the current point in time is in an interval of infrequent use or an interval of frequent use and provide the first weight factor w1 with the value of the interval of the prediction, i.e. with the first or the second value J1 or J2.

If for instance the use of an item, such as the first item I1, has the pattern where there is a first time interval of infrequent use of length L1, in which the frequency f is lower than a first frequency threshold and a second interval of more frequent use of length L2, in which the frequency f is higher than a second frequency threshold, where the first frequency threshold is lower than the second frequency threshold and the time intervals are set to recur at a cycle or period T, then it is possible to predict, based on the length and periods of previous time intervals, when the intervals will be repeated. It is then possible to assign the first value J1 to the first weight factor w1 if the first interval is predicted to occur and the second value J2 to the first weight w1 if the second interval is predicted to occur.

The first weight factor w1 may thus be set as $$w1 = J1 \text{ or } J2 \qquad (2)$$

based on which interval is predicted to be presently in force.

This may be of advantage if the user has a number of different maintenance rounds being regularly walked in which the items of the process control objects being passed in a round would historically be selected more frequently during the round than other process control object being passed in other maintenance rounds.

The item selection control element 38 may also set a second use dependent weight factor w2 having a dependency on the number of times the item is selected as well as on the time since the latest selection.

The second weight factor w2 may thus be a factor that is dependent on the frequency of use of the item. As an example it may have the form of $$w2 = k/(1+(t-t0)) \quad (3)$$

where k is a constant, t is the current time and t0 is the time of creation or latest use of the item. This is just one example of a function of the second weight factor w2. It is for instance possible to use an exponential function instead, such as $e^{-k(t-t0)}$.

The provision of the first and second weight factors may furthermore be combined. It is in this regard possible that the first weight factor w1 is not initially used, but that the second weight factor w2 is the only use-dependent weight factor that is initially used. This may continue up until enough data has been collected to be used for determining use patterns for the first weight factor. Thereafter it is possible that only the first weight factor w1 is used when there are usage patterns. If then patterns cease to exist or if they become unreliable it is possible to return and only use the second weight factor w2.

It is also possible to only provide one of the use dependent weight factors, either the first or the second.

A third weight factor w3 may be a position based weight factor, i.e. a weight factor that is based on the position of the corresponding process control object and the position of the user in the process control system. In short the position weight factor may be dependent on the distance d between the process control object and the user. This is exemplified in FIG. 4 by the distance d between the user position UP and the first process control object 24. The third weight factor w3 may for instance be inversely proportional to the distance d between the process control object and the user.

The third weight factor w3 may as an example be set as $$w3 = i/(1+d) \quad (4)$$

where i is a constant and d is the distance between the user position and the process control object. The relationship between weight and position may also here be exponential instead.

A weight factor may also be dependent on events in the process control system, such as alarms.

A fourth weight factor w4 may therefore be an alarm based weight factor that is changed based on the reception by the item communication control element 38 of an alarm indicator or alarm information related to the process control object.

This means that the communication control element in this case receives alarm information about the process control object associated with the item and changes the alarm based weight factor w4 based on this alarm indicator.

The fourth weight factor w4 may for instance be set according to $$w4 = h*A \quad (5)$$

where h is a constant and A is a binary signal representing the presence or absence of an alarm.

Another event dependent weight factor is a maintenance weight factor, which is a fifth weight factor w5.

The fifth weight factor w5 may be set as $$w5 = g*M \quad (6)$$

where g is a constant and M is a maintenance ongoing indicator.

The indicator M may here be set based on an electronic work order. The wireless terminal 32 may receive a work order, for instance in the form of an electronic file with indications of which process control objects that are to receive maintenance in a maintenance round. The item communication control element 38 may then be informed of the process control objects for which maintenance is to be carried out based on such a work order. It may also itself inspect the work order and extract data of the process control objects that are to be serviced. The process control objects which are indicated as needing to receive maintenance in the work order may then receive an indicator value M=1, leading to the corresponding weight w5 to be set through the indicator being set to M=1. When the work order is returned by the user, or after maintenance being completed on a specific process control object, the indicator may be set to M=0. The item communication control element 38 may thus detect a setting in the work order by the user indicating that maintenance of one or more process control objects is finished and thereby set the indicator M to a low value. It may also set the indicator M to a low value by detecting the sending of the work order from the wireless terminal to the process control system, The maintenance indicator M may also be set M=1 in dependence on the reception of a maintenance start signal and may be set M=0 in dependence of the reception of a maintenance end signal, and thus the value of the weight w5 may be increased if a maintenance start signal is received and decreased if a maintenance end signal is received.

The above mentioned weight factors may, perhaps with the exception of the fourth weight factor, all have a dependency on the user of the wireless terminal. However, it is possible that items are weighted also based on activities of other users.

There may therefore exist a sixth weight factor w6 that depends on other users, such as other maintenance engineers. The sixth weight factor may therefore be considered to be a colleague weight factor. This means that it is possible that if an item has been accessed by one or more other users, or the other user(s) has/have in some other way shown interest in the process control object in question, then this weight factor may be set. Thus a record of previous access to a process control object, or to its data, or historical data, or maintenance record by another user may be used to calculate a measure of interest shown by the colleague(s) in respect of any particular process control object or item.

When the weight factor considers other users, then the weight factor may be set based on the frequency of use of item by the other user(s). The weight factor may also be binary, where if one or more other users have indicated an interest in the process control object, then the weigh factor receives a corresponding value. These two ways can also be combined in that the sixth weight factor may have a first part that varies with the frequency of item use and a second part which is binary and only has a value based on interest indications.

There are different ways in which it is possible to determine that there is an indication of interest. It is possible that the other user uses a short range communication unit, like an NFC unit, of his wireless terminal for identifying the process control object on site. Such an attempted identification may then be detected and stored for the process control object and linked to the item, either by the process control object itself or by the wireless terminal of the other user as an indication of interest. Another variation is that the other user has a work order concerning maintenance of the process control object. If then the other user passes close by the process control object, then an indication may be generated. In the latter case an interest indication is generated through detecting that the other user is close to the process control object and has received a work order for maintenance of the same object. It is thus possible that the sixth weight factor depends on a detected or predicted local interaction with the process control object by one or more other users, such as local interaction at the location of the process control object.

It is here possible that the sixth weight is only used for users of the same type, such as only maintenance engineers. It is also possible that there is another restriction, such as maintenance engineers responsible for a certain area of the process control system.

The sixth weight factor may furthermore be related to the third weight factor. The sixth weight factor may for instance only start to be used if the user is in proximity of the process control object. If for instance the third weight factor exceeds a threshold corresponding to the user being close to the process control object, then also the sixth weight factor may be started to be used for determining the weight. Such a dependency of the sixth weight factor on the distance between the user and the process control object may also take place without the use of the third weight factor. The sixth weight factor may thus be used without the third weight factor, but only if the user is close to the process control object.

The total weight W may then, as is indicated above, be obtained as a combination of all the weight factors, for instance as a sum of all weight factors. The weight W may also be a product of the factors determined based on continuous data, such as the first second and third weight factors, to which event based weight factors are added, such as the fourth and fifth weight factors.

When the total weights W have been determined for all items, the item communication control element 38 visually communicates the items to the user in an order that is set according to the updated item weights, step 70. The steps 62-70 in the method may thereafter be repeated and this repeating may be performed as long as the user uses the application or as long as the wireless terminal is turned on.

The visual communication may then involve only displaying the items with the highest weights that fit in the display screen, as depicted in FIG. 6, where only the five items I1-I5 with the highest weights are being visually communicated. Here the items I6-I10 all have lower weights and are thus not being displayed.

In this way it is possible to visually communicate the items to the user in an adaptive way. The user may in this way more easily locate the items he or she is interested in, which may make maintenance more efficient. The user may thereby avoid scrolling through long lists in order to obtain the item that he or she needs. Through the use of weights it is thereby possible to determine when an item is to fade away from the screen. In this way only those items that may be of interest to the user are displayed. Furthermore the user does not have to make any selections.

Further advantages include:
  Older previously used items will get a reduced weight, meaning they will no longer appear in the top of the list.
  The clutter of the screen is reduced. The small displays on the wireless terminal should be used to display relevant information, not outdated information. The invention therefore provides a better user experience.

In the visually communicated list of item, the user may then select an item and when that is done further data may be obtained such as a face plate, an image of the object or other data, such as user manuals, blue prints, circuit diagrams etc.

There are a number of variations that are possible to make of this determination of weights for the items.

As the process control system is provided in different areas, exemplified by the first, second and third buildings in FIG. 4, this aspect can be considered in the updating. The continuous updating of at least one weight may be halted for an item if the area in which the user is located differs from the area in which the corresponding process control object is located, which can be exemplified by the situation depicted in FIG. 4. Here the determination of some or all of the weight factors for the items representing the second, third, fourth and fifth process control objects 26, 28, 30 and 31 may be halted or frozen, since the user is in the first building 45 and these process control objects are in the second and third buildings 54 and 56. However, the determination of the weights may continue for the items representing process control objects in the first building, i.e. for the first process control object 24.

The above-mentioned alarm weight may also be position dependent in that the alarm indicator or the alarm weight factor may only be used if the user is in the same area, here building, as the process control object for which an alarm is generated. The same principle may also be applied to the maintenance weight factor.

It is furthermore possible that the weights are compared with a removal threshold which may be set to reflect the item age, the size of the item list etc. If a weight falls below this removal threshold, the item may be deleted.

As items are phased out it does not have mean that the item need to be automatically be deleted forever. One solution is to archive them instead of deleting them.

It is also possible that the weights are compared with an archiving threshold. An item, the weight of which falls below the archiving threshold may then be stored in the item archive 19. These two variations are implied in FIG. 6. Here the sixth and the seventh items I6 and I7 are above such thresholds but do not have high enough weights be presented. However, they still remain in the list of items. The eighth, ninth and tenth items I8, I9 and I10 are on the other hand below such a threshold, a removal or an archiving threshold, and will therefore be removed and deleted or stored in the item archive 19 by the item communication control element 38.

Through the use of such threshold it is possible to determine when an item is to fade away from the list. If the user is no long using the item it can be silently removed from the list and instead archived or deleted.

The removal or archiving provides further advantages:

The item list will eventually phase out old items in order to only keep the most relevant items in the list. Thereby the item list will not be filled with old outdated items that have become outdated; only recently added or selected items may be visible. This also reduces cognitive load of the users. The users do not manually have to remove old items they are no longer working with.

If the item communication control block acts as item communication control unit, it may obtain the user position for the positioning unit and the user items selections from the item communication control element.

It may also obtain the indications from the process control system, an then provide the item communication control element at least with data indicating the order in which the items are to be visually communicated.

Figure 8:
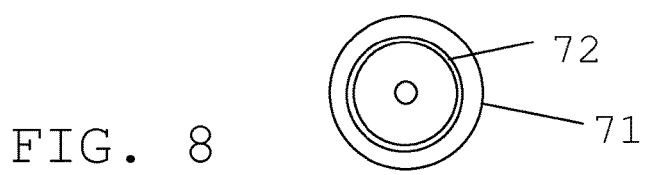

The positioning unit and item communication control unit may be provided in the form of one or more processors together with computer program memory including computer program code for performing their functions. As an alternative they may be provided in the form of one or more Application Specific Integrated Circuits (ASIC) or Field-Programmable Gate Arrays (FPGA). This computer program code may also be provided on one or more data carriers which perform the functionality of the present invention when the program code thereon is being loaded into one or more devices implementing the searching arrangement, such as the searching server and/or the wireless terminal. One such data carrier 71 with computer program code 72, in the form of a CD ROM disc, is schematically shown in FIG. 8. Such computer program may as an alternative be provided on another server and downloaded therefrom into the searching server and/or the mobile terminal.

The invention can be varied in many more ways than the ones already mentioned. It is also possible that the application allows searches to be made about process control objects, for instance searches according to type of process control object. A user may for instance want to locate boilers. The search results may then be provided in an order set according to the weights of the items.

It is also possible that the wireless terminal detects the identities of objects passed by the wireless terminal. The detection may be done using a suitable short range communication unit employing a short range communication technique such as NFC, bar code reading or Bluetooth. This may also be used when determining the distance between process control objects and user as well as for indicating that maintenance is started and ended.

It should therefore be realized that the present invention is only to be limited by the following claims.

The invention claimed is:

1. A method for communicating items representing process control objects in the form of field devices to a user of a wireless terminal with a display screen in a computerized process control system for controlling an industrial process, where each of the items is a data item that is a reference to other data about a corresponding, different process control object, the method being performed in an item communication control unit of an item communication arrangement and comprising:
   continuously determining weights of the items, and
   displaying the items with the highest weights to the user via the wireless terminal that fit in the display screen and in an order defined by the weights of the items,
   wherein the weight of an item is determined based on an item selection pattern of the user and comprises a position weight factor based on the position of the corresponding process control object and the position of the user, where the position weight factor decreases with increasing distance between the process control object and the user,
   wherein the weight of said item reflects a predicted use of the item based on the item selection pattern of the user, and
   wherein the pattern is a pattern of usage over time of the item comprising intervals of frequent use separated by intervals of infrequent use, and the weight comprises a first weight factor, the method further comprising predicting if the use of the item at a current point in time is in the interval of infrequent use or the interval of frequent use and assigning a first value to the first weight factor in case the interval is the interval of infrequent use and a second value in case the interval is the interval of frequent use, where the second value is higher than the first value.

2. The method according to claim 1, wherein the weight comprises a second weight factor depending on the time since the latest selection or creation of the item.

3. The method according to claim 1, wherein the process control system is provided in different areas and the continuous updating of at least one weight is halted if an area in which the user is differs from the area in which the corresponding process control object is located.

4. The method according to claim 1, wherein the weight comprises an alarm weight factor and further comprising obtaining an alarm indicator about the corresponding process control object and changing the alarm weight factor based on the value of the alarm indicator.

5. The method according to claim 1, wherein the weight comprises a maintenance weight factor and further comprising obtaining a maintenance indicator concerning the corresponding process control object and changing the maintenance weight factor based on the value of the maintenance indicator.

6. The method according to claim 1, wherein the weight comprises a colleague weight factor depending on interest shown in the process control object by other users.

7. An item communication system for communicating items representing process control objects in the form of field devices to a user of a wireless terminal with a display screen in a computerized process control system for controlling an industrial process, where each of the items is a data item that is a reference to other data about a corresponding, different process control object, the item communication system comprising:
   an item communication control unit providing said items representing the process control objects and configured to
      continuously determine weights of the items, and
      display the items with the highest weights to the user via the wireless terminal that fit in the display screen and in an order defined by the weights of the items,
   wherein the weight of an item is determined based on an item selection pattern of the user and comprises a position weight factor based on the position of the corresponding process control object and the position of the user, where the position weight factor decreases with increasing distance between the process control object and the user,
   wherein the weight of said item reflects a predicted use of the item based on the item selection pattern, and
   wherein the pattern is a pattern of usage over time of the item comprising intervals of frequent use separated by intervals of infrequent use, and the weight comprises a first weight factor, the an item communication control unit being further configured to predict if the use of the item at a current point in time is in the interval of infrequent use or the interval of frequent use and assigning a first value to the first weight factor in case the interval is the interval of infrequent use and a second value in case the interval is the interval of frequent use, where the second value is higher than the first value.

8. The item communication system according to claim 7, further comprising a position unit configured to detect the position of the wireless terminal and provide the position to the searching unit as user position.

9. The item communication system according to claim 7, wherein the weight comprises a second weight factor depending on the time since the latest selection or creation of the item.

10. The item communication system according to claim 7, wherein the process control system is provided in different areas and the item communication control unit is configured to halt the continuous updating of at least one weight if an area in which the user is differs from the area in which the corresponding process control object is located.

11. The item communication system according to claim 7, wherein the weight comprises an alarm weight factor and the item communication control unit is configured to obtain an alarm indicator about the corresponding process control object and change the alarm weight factor based on the value of the alarm indicator.

12. The item communication system according to claim 7, wherein the weight comprises a maintenance weight factor and the item communication control unit is configured to obtain a maintenance indicator concerning the corresponding process control object and change the maintenance weight factor based on the value of the maintenance indicator.

13. The item communication system according to claim 7, wherein the weight comprises a colleague weight factor depending on interest shown in the process control object by other users.

14. A computer program product for communicating items representing process control objects in the form of field devices to a user of a wireless terminal with a display screen in a computerized process control system for controlling an industrial process, where each of the items is a data item that is a reference to other data about a corresponding, different process control object, said computer program product being provided on a non-transitory data carrier comprising computer program code configured to cause an item communication system to, when said computer program code is loaded into at least one device providing the item communication system, continuously determine weights of the items, and display the items with the highest weights to the user via the wireless terminal that fit in the display screen and in an order defined by the weights of the items, wherein the weight of an item is determined based on an item selection pattern of the user and comprises a position weight factor based on the position of the corresponding process control object and the position of the user, where the position weight factor decreases with increasing distance between the process control object and the user, wherein the weight of said item reflects a predicted use of the item based on the item selection pattern of the user, and wherein the pattern is a pattern of usage over time of the item comprising intervals of frequent use separated by intervals of infrequent use, and the weight comprises a first weight factor, the computer program code being further configured to predict if the use of the item at a current point in time is in the interval of infrequent use or the interval of frequent use and assigning a first value to the first weight factor in case the interval is the interval of infrequent use and a second value in case the interval is the interval of frequent use, where the second value is higher than the first value.

* * * * *